(12) United States Patent
Shin et al.

(10) Patent No.: US 11,984,264 B2
(45) Date of Patent: May 14, 2024

(54) MULTILAYER ELECTRONIC COMPONENT

(71) Applicant: SAMSUNG ELECTRO-MECHANICS CO., LTD., Suwon-si (KR)

(72) Inventors: Jin Bok Shin, Suwon-si (KR); Yu Ra Shin, Suwon-si (KR); Seung Yong Lee, Suwon-si (KR); Jung Hyun An, Suwon-si (KR); Yong Hwa Lee, Suwon-si (KR); Da Hyeon Go, Suwon-si (KR); Choong Seop Jeon, Suwon-si (KR); Min Soo Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 85 days.

(21) Appl. No.: 17/512,063

(22) Filed: Oct. 27, 2021

(65) Prior Publication Data

US 2022/0208452 A1    Jun. 30, 2022

(30) Foreign Application Priority Data

Dec. 31, 2020    (KR) .................. 10-2020-0189099

(51) Int. Cl.
| | |
|---|---|
| *H01G 4/12* | (2006.01) |
| *H01G 4/012* | (2006.01) |
| *H01G 4/232* | (2006.01) |
| *H01G 4/30* | (2006.01) |

(52) U.S. Cl.
CPC ............. *H01G 4/1209* (2013.01); *H01G 4/30* (2013.01); *H01G 4/012* (2013.01); *H01G 4/232* (2013.01)

(58) Field of Classification Search
CPC ........ H01G 4/30; H01G 4/1209; H01G 4/012; H01G 4/232; H01G 4/1227
USPC .............. 361/301.4, 311, 321.1, 321.4, 321.5
See application file for complete search history.

(56) References Cited

U.S. PATENT DOCUMENTS

| | | | |
|---|---|---|---|
| 2008/0068777 A1* | 3/2008 | Takeoka .............. | C04B 35/4682 361/321.4 |
| 2011/0141655 A1 | 6/2011 | Jeong et al. | |
| 2011/0141660 A1 | 6/2011 | Jeong et al. | |
| 2016/0196918 A1* | 7/2016 | Hong ..................... | H01G 4/232 361/301.4 |
| 2018/0012702 A1* | 1/2018 | Azuma .................. | H01G 4/248 |
| 2018/0068797 A1* | 3/2018 | Chigira ................. | H01G 4/008 |

(Continued)

FOREIGN PATENT DOCUMENTS

| | | |
|---|---|---|
| KR | 10-2011-0065623 A | 6/2011 |
| KR | 10-2011-0065625 A | 6/2011 |

*Primary Examiner* — Arun Ramaswamy
(74) *Attorney, Agent, or Firm* — MORGAN, LEWIS & BOCKIUS LLP (57) ABSTRACT

A multilayer electronic component includes: a body including a capacitance forming portion in which dielectric layers and internal electrodes are alternately disposed in a first direction, and cover portions disposed on an upper surface and a lower surface of the capacitance forming portion, respectively, in the first direction; and external electrodes disposed on the body, wherein the cover portion includes a plurality of dielectric grains and a plurality of pores, and Gn/Pn is more than 10 and less than 30, in which Gn is the number of dielectric grains included in the cover portion and Pn is the number of pores included in the cover portion.

22 Claims, 12 Drawing Sheets

(56) References Cited

U.S. PATENT DOCUMENTS

2018/0240592 A1* 8/2018 Morita ............... H01G 4/30
2019/0348222 A1* 11/2019 Kato ................ H01G 4/30
2019/0362897 A1* 11/2019 Kato ............... H01G 4/232

* cited by examiner

MULTILAYER ELECTRONIC COMPONENT

CROSS-REFERENCE TO RELATED APPLICATION(S)

This application claims the benefit of priority to Korean Patent Application No. 10-2020-0189099 filed on Dec. 31, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip type condenser mounted on the printed circuit boards of various types of electronic products such as an image display apparatus, for example, a liquid crystal display (LCD), a plasma display panel (PDP), or the like, a computer, a smartphone, a cellular phone, and the like, to serve to charge or discharge electricity therein or therefrom.

The multilayer ceramic capacitor may be used as a component of various electronic apparatuses since it has a small size, implements a high capacitance, and may be easily mounted. Recently, in accordance with miniaturization of components of electronic apparatuses, demand for miniaturization and increases in capacitance of the multilayer ceramic capacitor have increased.

In general, in a method of manufacturing such a multilayer ceramic capacitor, a ceramic green sheet is manufactured, and a conductive paste is printed on the ceramic green sheet to form an internal electrode film. Several tens to several hundreds of ceramic green sheets on which the internal electrode films are formed are stacked to be overlapped with each other, thereby forming a green ceramic laminate. Then, the green ceramic laminate is compressed at a high temperature and a high pressure to form a hard green ceramic laminate, and a cutting process is performed on the hard green ceramic laminate to manufacture a green chip. Then, the green chip is burned-out, sintered, and polished, and external electrodes are formed to complete the multilayer ceramic capacitor.

In general, internal electrodes formed of a metal are more easily contracted and expanded than internal electrodes formed of a ceramic material, and stress due to a difference between coefficients of thermal expansion acts on the ceramic laminate, such that cracks may occur in the ceramic laminate.

The multilayer ceramic capacitor is used in a state in which it is mounted on a wiring board. External electrodes of the multilayer ceramic capacitor are soldered and electrically connected to a conductive land formed on the wiring board. When the multilayer ceramic capacitor is mounted on the wiring board through soldering or when the wiring board on which the multilayer ceramic capacitor is mounted is cut, thermal impact and shear stress may be applied to the multilayer ceramic capacitor. Such thermal impact and shear stress may cause a crack in the multilayer ceramic capacitor.

Recently, in accordance with miniaturization and a capacitance increase of the multilayer ceramic capacitor, an attempt to make the ceramic laminate thin and highly layered has been conducted. As the ceramic laminate has become thinner and highly layered, crack occurrence frequency has increased. Therefore, the necessity to solve this problem has increased.

SUMMARY

An aspect of the present disclosure may provide a multilayer electronic component in which crack occurrence is suppressed.

Another aspect of the present disclosure may provide a multilayer electronic component having improved waterproof reliability.

According to an aspect of the present disclosure, a multilayer electronic component may include: a body including a capacitance forming portion in which dielectric layers and internal electrodes are alternately disposed in a first direction, and cover portions disposed on an upper surface and a lower surface of the capacitance forming portion, respectively, in the first direction; and external electrodes disposed on the body, wherein the cover portion includes a plurality of dielectric grains and a plurality of pores, and Gn/Pn is more than 10 and less than 30, in which Gn is the number of dielectric grains included in the cover portion and Pn is the number of pores included in the cover portion.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Herein, a lower side, a lower portion, a lower surface, and the like, are used to refer to a direction toward a mounted surface of the fan-out semiconductor package in relation to cross sections of the drawings, while an upper side, an upper portion, an upper surface, and the like, are used to refer to an opposite direction to the direction. However, these directions are defined for convenience of explanation, and the claims are not particularly limited by the directions defined as described above.

The meaning of a "connection" of a component to another component in the description includes an indirect connection through an adhesive layer as well as a direct connection between two components. In addition, "electrically connected" means the concept including a physical connection and a physical disconnection. It can be understood that when an element is referred to with "first" and "second", the element is not limited thereby. The terms "first," "second," etc. may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

Terms used herein are used only in order to describe an exemplary embodiment rather than limiting the present disclosure. In this case, singular forms include plural forms unless interpreted otherwise in context.

In the drawings, a first direction may be defined as a stack direction or a thickness (T) direction, a second direction may be defined as a length (L) direction, and a third direction may be defined as a width (W) direction.

Multilayer Electronic Component

Figure 1:
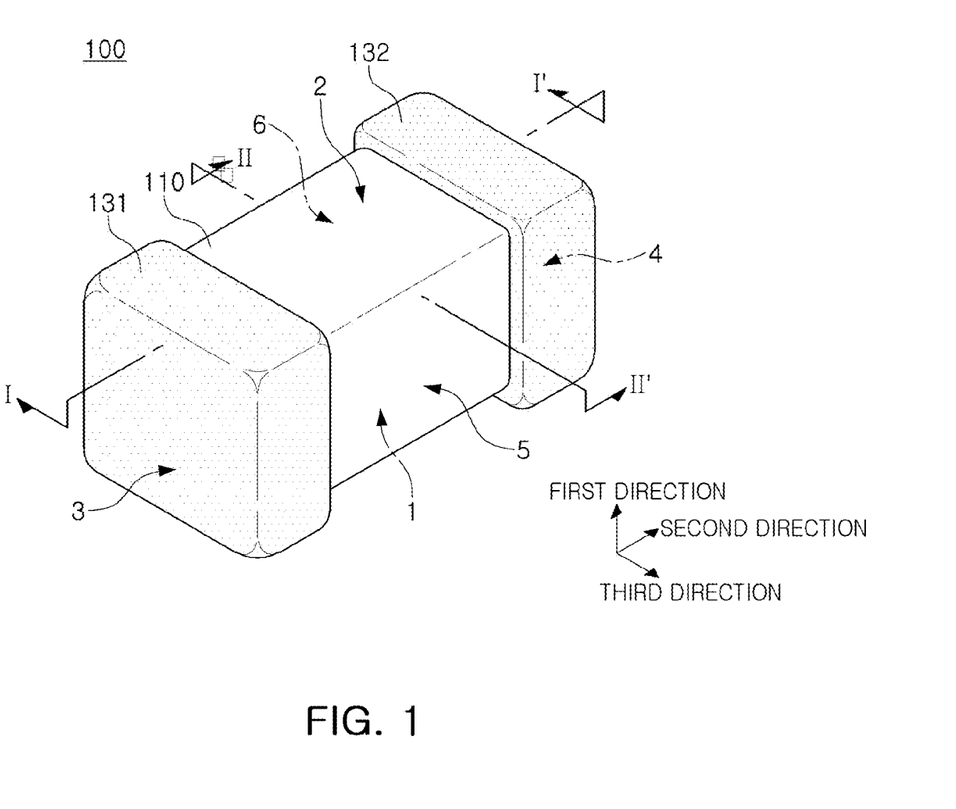
FIG. 1 is a perspective view schematically illustrating a multilayer electronic component according to an exemplary embodiment in the present disclosure.

FIG. 1 is a perspective view schematically illustrating a multilayer electronic component according to an exemplary embodiment in the present disclosure.

Figure 2:
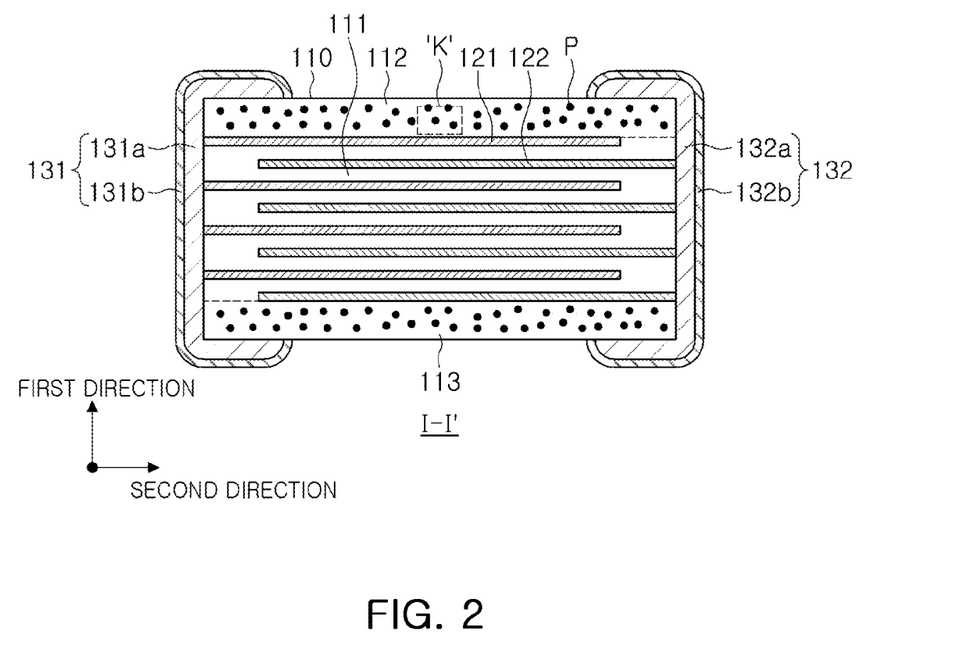
FIG. 2 is a cross-sectional view taken along line I-I' of FIG. 1.

FIG. 2 is a cross-sectional view taken along line I-I' of FIG. 1.

Figure 3:
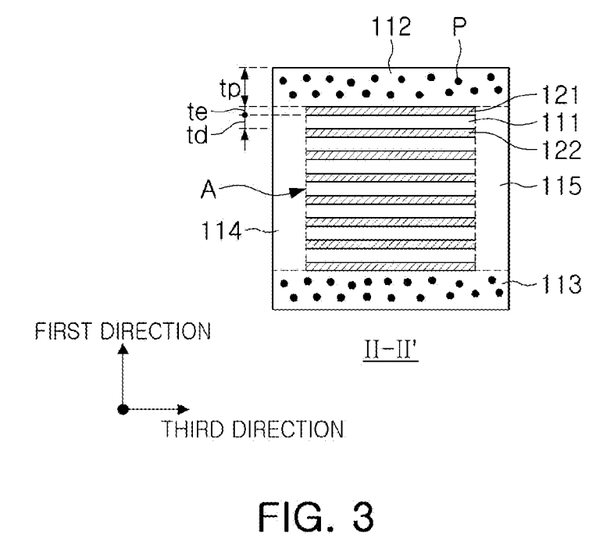
FIG. 3 is a cross-sectional view taken along line II-II' of FIG. 1.

FIG. 3 is a cross-sectional view taken along line II-II' of FIG. 1.

Figure 4:
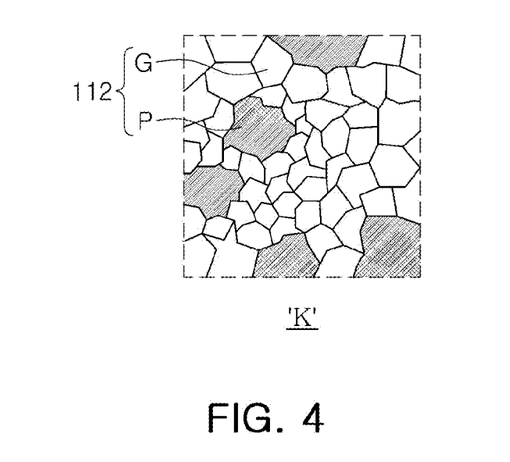
FIG. 4 is an enlarged view illustrating region K of FIG. 2.

FIG. 4 is an enlarged view illustrating region K of FIG. 2.

Figure 5:
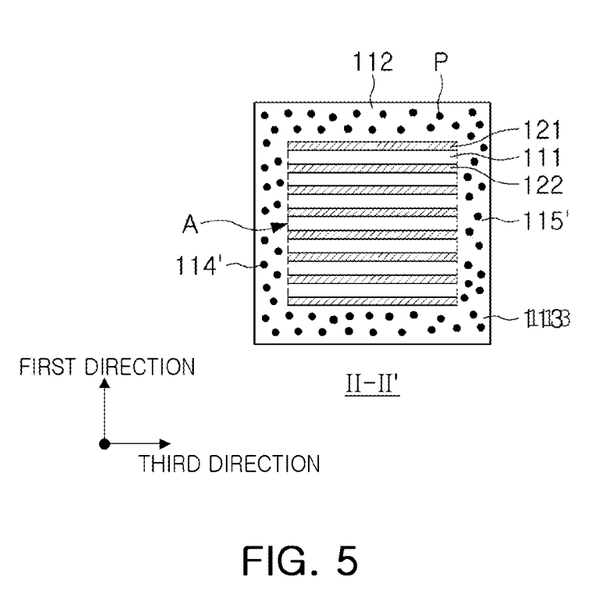
FIG. 5 is a view illustrating a modification of the present disclosure corresponding to the cross-sectional view taken along line II-II' of FIG. 1.

FIG. 5 is a view illustrating a modification of the present disclosure corresponding to the cross-sectional view taken along line II-II' of FIG. 1.

Hereinafter, a multilayer electronic component according to an exemplary embodiment in the present disclosure will be described in detail with reference to FIGS. 1 through 5.

A multilayer electronic component 100 according to an exemplary embodiment in the present disclosure may include a body 110 including a capacitance forming portion A in which dielectric layers 111 and internal electrodes 121 and 122 are alternately disposed in a first direction, and cover portions 112 and 113 disposed on an upper surface and a lower surface of the capacitance forming portion, respectively, in the first direction; and external electrodes 131 and 132 disposed on the body, wherein the cover portion includes a plurality of dielectric grains G and a plurality of pores P, and Gn/Pn is more than 10 and less than 30, in which Gn is the number of dielectric grains included in the cover portion and Pn is the number of pores included in the cover portion.

The dielectric layers 111 and the internal electrodes 121 and 122 may be alternately stacked in the body 110.

A specific shape of the body 110 is not particularly limited, but may be a hexahedral shape or a shape similar to the hexahedral shape, as illustrated in FIG. 1. Although the body 110 does not have a hexahedral shape having perfectly straight lines due to shrinkage of ceramic powder included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer 111 is not particularly limited as long as a sufficient capacitance may be obtained. For example, a barium titanate-based material, a lead composite perovskite-based material, a strontium titanate-based material, or the like may be used. An example of the barium titanate-based material may include $BaTiO_3$-based ceramic powder. Examples of the ceramic powder may include $BaTiO_3$, and $(Ba_{1-x}Ca_x)TiO_3$, $Ba(Ti_{1-y}Ca_y)O_3$, $(Ba_{1-x}Ca_x)(Ti_{1-y}Zr_y)O_3$, and $Ba(Ti_{1-y}Zr_y)O_3$ that are obtained by partially solid-dissolving calcium (Ca), zirconium (Zr), or the like, in $BaTiO_3$.

A material of the dielectric layer 111 may be prepared by adding various ceramic additives, organic solvents, binders, dispersants, and the like, to powder such as barium titanate ($BaTiO_3$) powder, according to an object of the present disclosure.

The body 110 may include the capacitance forming portion A disposed inside the body 110 and including first internal electrodes 121 and second internal electrodes 122 disposed to face each other with each of the dielectric layers 111 interposed therebetween to form a capacitance, and the cover portions 112 and 113 formed on the upper surface and the lower surface of the capacitance forming portion A, respectively, in the first direction.

In addition, the capacitance forming portion A, which is a portion contributing to form a capacitance of a capacitor, may be formed by repeatedly stacking a plurality of first and second internal electrodes 121 and 122 with each of the dielectric layers 111 interposed therebetween.

Meanwhile, the dielectric layer 111 included in the capacitance forming portion A may include pores, and a porosity may be preferably 1% or less in terms of securing a capacitance. Here, the porosity may be measured by observing, with an SEM, the dielectric layer positioned at the center of a sample chip in the first and second directions in a cross section of the sample chip taken along the first and second directions at the center of the sample chip in the third direction.

The cover portions 112 and 113 may include an upper cover portion 112 disposed on the upper surface of the capacitance forming portion A in the first direction and a lower cover portion 113 disposed on the lower surface of the capacitance forming portion A in the first direction.

The upper and lower cover portions 112 and 113 may be formed by stacking a single dielectric layer or two or more dielectric layers on the upper and lower surfaces of the capacitance forming portion A, respectively, in a thickness direction, and may serve to prevent damage to the internal electrodes due to physical or chemical stress.

In addition, according to an exemplary embodiment in the present disclosure, each of the cover portions 112 and 113 may include the plurality of dielectric grains G and the plurality of pores P. The plurality of pores P are included in the cover portions, such that an occurrence and spread of cracks due to an external force may be suppressed.

In addition, Gn/Pn may be more than 10 and less than 30, in which Gn is the number of dielectric grains G included in the cover portions 112 and 113 and Pn is the number of pores P included in the cover portions 112 and 113.

When Gn/Pn is 10 or less, a ratio of the pores P is too high, such that the pores may act as moisture permeation paths. Therefore, waterproof reliability may deteriorate. Therefore, Gn/Pn is preferably more than 10, and may be more preferably 12 or more.

On the other hand, when Gn/Pn is 30 or more, the ratio of the pores P is too small, such that the occurrence and spread of cracks due to the pores P may not be sufficiently suppressed. Therefore, Gn/Pn is preferably less than 30, and may be more preferably 29 or less.

In an exemplary embodiment, Ps/Gs may be less than 3, in which Gs is an average size of the dielectric grains G and Ps is an average size of the pores P.

When Ps/Gs is 3 or more, a size of the pore P becomes too large, such that moisture permeation may easily occur. Therefore, the waterproof reliability may deteriorate. Therefore, Ps/Gs is preferably less than 3, and may be more preferably 2.9 or less.

A lower limit of Ps/Gs is not particularly limited. However, in order to more efficiently suppress the occurrence and spread of cracks due to the pores P, Ps/Gs may be 2.1 or more.

When Gn/Pn and Ps/Gs are within numerical ranges presented in the present disclosure, the occurrence and spread of cracks may be suppressed, and the waterproof reliability may be improved. Therefore, a thickness of each of the upper and lower cover portions 112 and 113 is not particularly limited. However, when the thickness of each of the cover portions 112 and 113 is too small, the spread of cracks may be not sufficiently suppressed, and when the thickness of each of the cover portions 112 and 113 is too large, a capacitance per unit volume may be reduced. Therefore, the thickness of each of the upper and lower cover portions may be in a range from 15 µm to 30 µm.

In addition, each of the average size of the dielectric grains Gs and the average size of the pores Ps is not particularly limited.

However, as a non-limiting example, the average size of the dielectric grains Gs may be in a range from 150 nm to 390 nm. In addition, the average size of the pores Ps may be in a range from 110 nm to 310 nm.

Each of the cover portions 112 and 113 may not include internal electrodes and may include a ceramic material. For example, each of the cover portions 112 and 113 may include a barium titanate($BaTiO_3$)-based ceramic material.

Meanwhile, a method of adjusting the numbers and sizes of the dielectric grains and the pores in the cover portions 112 and 113 is not particularly limited. As a preferred example, the cover portions 112 and 113 may be formed using a ceramic green sheet for forming pores, containing a volatile substance.

Figure 6:
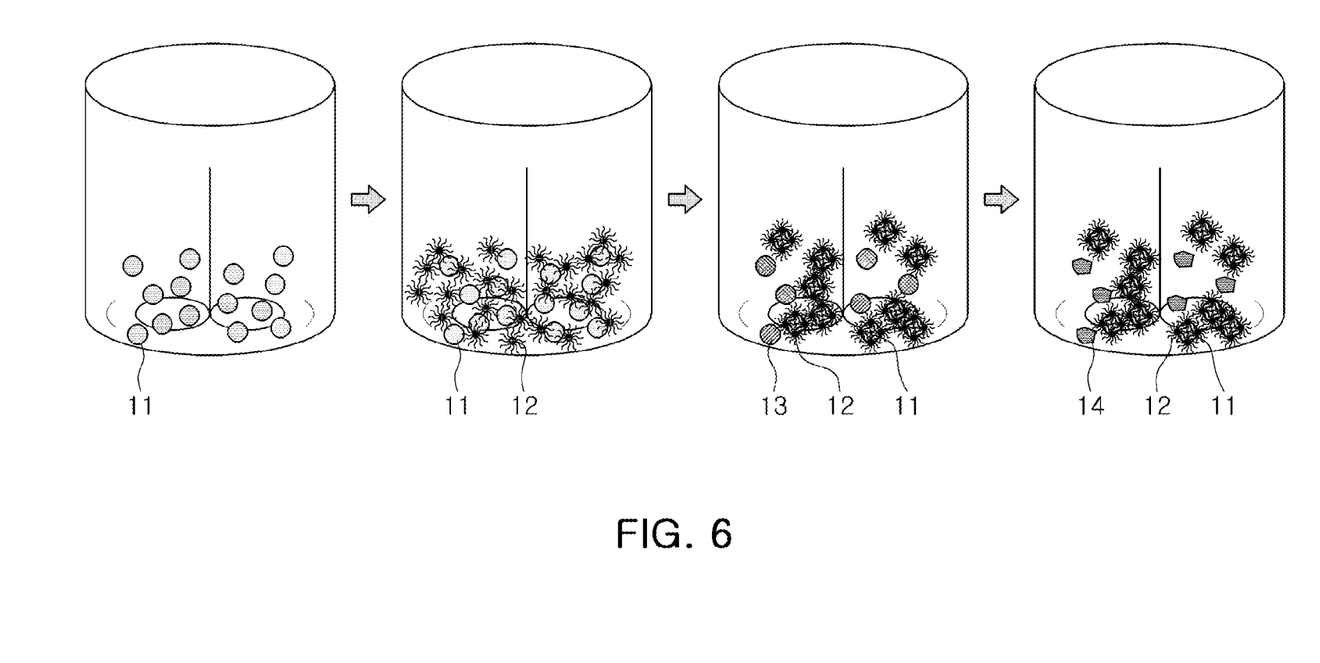
FIG. 6 is a view for describing preparation of a material of a ceramic green sheet for forming pores.
Figure 7:
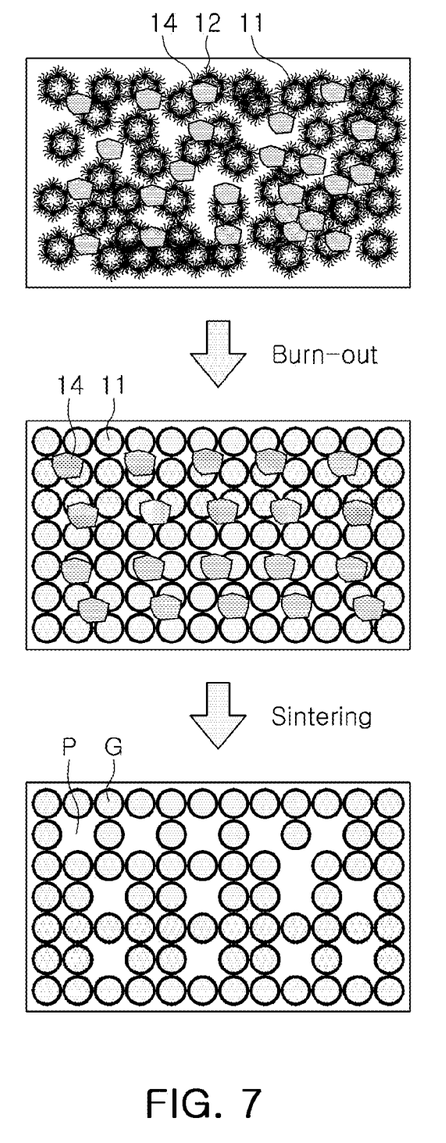
FIG. 7 is a view for describing formation of the pores by performing a burn-out and sintering process on the ceramic green sheet for forming pores.

FIG. 6 is a view for describing preparation of a 7 is a view for describing formation of the pores by performing a burn-out and sintering process on the ceramic green sheet for forming pores.

A detailed description will be provided with reference to FIGS. 6 and 7. A material of the ceramic green sheet for forming pores may be prepared by mixing $BaTiO_3$ 11 and then adding metal nitrate 12 to mix the $BaTiO_3$ 11 with the metal nitrate 12. Accordingly, the metal nitrate 12 may surround the $BaTiO_3$ 11. Then, a barium source 13 may be added and mixed. The barium source 13 may react with the metal nitrate 12 to form barium nitrate 14. Sintering may be performed by adjusting the amounts of metal nitrate 12 and barium source 13, and then, the number and sizes of the pores may be adjusted.

In this case, the metal nitrate 12 may include one or more of Mg, Mn, Al, Dy, Tb, V, Zr, and Y, and the barium source 13 may include one or more of $Ba(OH)_2$, $BaCO_3$, and $BaCl_2$.

When the ceramic green sheet for forming pores is subjected to a burn-out process, the metal nitrate 12 may volatilize, and the barium nitrate 14 and the $BaTiO_3$ 11 may remain. Then, when the ceramic green sheet for forming pores is subjected to a sintering process, the $BaTiO_3$ 11 may be sintered to form the dielectric grains G, and the pores P may be formed as the barium nitrate 14 volatilizes.

As another method of adjusting the numbers and sizes of the dielectric grains and the pores, a ceramic green sheet for forming pores, containing a material obtained by mixing $BaTiO_3$ 11 and a polymer blend with each other may be used. In this case, the polymer blend may refer to a mixture of different organic materials. Sintering may be performed by adjusting the amount and mixing ratio of the polymer blend, and then, the number and sizes of the pores may be adjusted.

In addition, the polymer blend may contain polyvinyl butyral (PVB) and a polyacrylate-based organic material.

In an exemplary embodiment, side margin portions 114 and 115 may be disposed on the fifth and sixth surfaces of the body 110, respectively.

In order to miniaturize the multilayer electronic component and to increase a capacitance of the multilayer electronic component, it is required to significantly increase an internal electrode effective area (increase an effective volume fraction required for implementing a capacitance). To this end, the internal electrodes 121 and 122 may be in contact with opposite end surfaces of the capacitance forming portion A in the third direction, such that an internal electrode area in a width direction may be significantly increased through a marginless design. The side margin portions 114 and 115 may be disposed on the fifth and sixth surfaces, respectively, such that a capacitance per unit volume may be increased, and a step in the width direction due to the internal electrodes may be suppressed. In order to suppress the step due to the internal electrodes 121 and 122, the side margin portions 114 and 115 may be formed by cutting the capacitance forming portion A obtained after stacking so that the internal electrodes 121 and 122 are in contact with the opposite end surfaces of the capacitance forming portion A in the third direction, and then stacking a single dielectric layer or two or more dielectric layers on each of the opposite end surfaces of the capacitance forming portion A in the third direction.

The side margin portions 114 and 115 may include a first side margin portion 114 disposed on the sixth surface 6 of the body 110 and a second side margin portion 115 disposed on the fifth surface 5 of the body 110. That is, the side margin portions 114 and 115 may be disposed on the opposite end surfaces of the capacitance forming portion A, respectively, in the third direction.

The side margin portions 114 and 115 may serve to prevent damage to the internal electrodes due to physical or chemical stress.

The internal electrodes 121 and 122 may include the first internal electrodes 121 in contact with the opposite end surfaces of the capacitance forming portion A in the third direction and the third surface, and the second internal electrodes 122 in contact with the opposite end surfaces of the capacitance forming portion A in the third direction and the fourth surface.

In this case, Gn1/Pn1 may be more than 10 and less than 30, in which Gn1 is the number of dielectric grains included in the side margin portions 114 and 115 and Pn1 is the number of pores included in the side margin portions 114 and 115.

When Gn1/Pn1 is 10 or less, a ratio of the pores is too high, such that the pores may act as moisture permeation paths. Therefore, the waterproof reliability may deteriorate. Therefore, Gn1/Pn1 is preferably more than 10, and may be more preferably 12 or more.

On the other hand, when Gn1/Pn1 is 30 or more, the ratio of the pores is too small, such that the occurrence and spread of cracks due to the pores P may not be sufficiently suppressed. Therefore, Gn1/Pn1 is preferably less than 30, and may be more preferably 29 or less.

In addition, Ps1/Gs1 may be less than 3, in which Gs1 is an average size of the dielectric grains included in the side margin portions 114 and 115 and Ps1 is an average size of the pores included in the side margin portions 114 and 115.

When Ps1/Gs1 is 3 or more, a size of the pore becomes too large, such that moisture permeation may easily occur. Therefore, waterproof reliability may deteriorate. Therefore, Ps1/Gs1 is preferably less than 3, and may be more preferably 2.9 or less.

A lower limit of Ps1/Gs1 is not particularly limited. However, in order to more efficiently suppress the occurrence and spread of cracks due to the pores, Ps1/Gs1 may be 2.1 or more.

The internal electrodes 121 and 122 and the dielectric layers 111 may be alternately disposed.

The internal electrodes 121 and 122 may include the first and second internal electrodes 121 and 122. The first and second internal electrodes 121 and 122 may be alternately disposed to face each other with each of the dielectric layers 111 interposed therebetween, and may be in contact with the third and fourth surfaces 3 and 4 of the body 110, respectively.

Referring to FIG. 3, the first internal electrodes 121 may be spaced apart from the fourth surface 4 and be in contact with the third surface 3, and the second internal electrodes 122 may be spaced apart from the third surface 3 and be in contact with the fourth surface 4. In addition, the first internal electrodes 121 may be in contact with the third, fifth, and sixth surfaces 3, 5, and 6, and the second internal electrodes 122 may be in contact with the fourth, fifth, and sixth surfaces 4, 5, and 6.

In this case, the first and second internal electrodes 121 and 122 may be electrically insulated from each other by each of the dielectric layers 111 disposed therebetween.

The internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

The external electrodes 131 and 132 may be disposed on the third and fourth surfaces 3 and 4 of the body 110, respectively.

The external electrodes 131 and 132 may be disposed on the third and fourth surfaces 3 and 4 of the body 110, respectively, and may include the first and second external electrodes 131 and 132 connected to the first and second internal electrodes 121 and 122, respectively. The internal electrodes 121 and 122 may include the first internal electrodes 121 in contact with the first external electrode 131 and the second internal electrodes 122 in contact with the second external electrode 132, and opposite ends of the first and second internal electrodes 121 and 122 in the third direction may be in contact with the side margin portions 114 and 115.

Referring to FIG. 1, the external electrodes 131 and 132 may be disposed to cover opposite end surfaces of the side margin portions 114 and 115 in the second direction.

A structure in which the multilayer electronic component 100 includes two external electrodes 131 and 132 is described in the present exemplary embodiment, but the number, shapes, or the like, of the external electrodes 131 and 132 may be changed depending on shapes of the internal electrodes 121 and 122 or other purposes.

Meanwhile, the external electrodes 131 and 132 may be formed of any material having electrical conductivity, such as a metal, a certain material of each of the external electrodes 131 and 132 may be determined in consideration of electrical characteristics, structural stability, or the like, and each of the external electrodes 131 and 132 may have a multilayer structure.

For example, the external electrodes 131 and 132 may include electrode layers 131a and 132a disposed on the body 110, and plating layers 131b and 132b formed on the electrode layers 131a and 132a, respectively.

As a more specific example, each of the electrode layers 131a and 132a may be a fired electrode including a conductive metal and glass, or a resin-based electrode including a conductive metal and a resin.

In addition, each of the electrode layers 131a and 132a may be formed by sequentially forming a fired electrode and a resin-based electrode on the body. In addition, each of the electrode layers 131a and 132a may be formed by transferring a sheet including a conductive metal on the body, or may be formed by transferring a sheet including a conductive metal on the fired electrode.

A material having excellent electrical conductivity may be used as the conductive metal included in the electrode layers 131a and 132a. However, the material of the conductive metal is not particularly limited. For example, the conductive metal may be one or more of nickel (Ni), copper (Cu), and alloys thereof.

The plating layers 131b and 132b may serve to improve mounting characteristics. Types of the plating layers 131b and 132b are not particularly limited. Each of the plating layers 131b and 132b may be a plating layer including one or more of Ni, Sn, Pd, and alloys thereof, or may include a plurality of layers.

As a more specific example, each of the plating layers 131b and 132b may be a Ni plating layer or a Sn plating layer, may be formed by sequentially forming the Ni plating layer and the Sn plating layer on each of the electrode layers 131a and 132a, and may be formed by sequentially forming the Sn plating layer, the Ni plating layer, and the Sn plating layer on each of the electrode layers 131a and 132a. In addition, each of the plating layers 131b and 132b may include a plurality of Ni plating layers and/or a plurality of Sn plating layers.

EXAMPLES

A sample chip in which the ratio (Gn/Pn) of the number of dielectric grains to the number of pores and the ratio (Ps/Gs) of the average size of the pores to the average size of the dielectric grains were as shown in Table 1 was prepared.

The crack suppression effect and waterproof reliability of the sample chip were evaluated. The results are shown in Table 1.

In the crack evaluation, the sintered sample chip was embedded in an epoxy mold and was observed with an optical microscope while polishing the sample chip. In a case where a crack occurred at a boundary between the capacitance forming portion and the cover portion and around the boundary, it was determined as NG.

In the waterproof reliability determination, after an electrical field of 1.5 Vr with respect to a guaranteed voltage was applied to the sample chip at 85° C. and relative humidity of 85% for 12 hours, when insulation resistance was decreased by 4 orders or more from initial insulation resistance, it was determined as NG.

The numbers and sizes of the pores and the dielectric grains in the cover portion were measured by analyzing an image obtained by scanning the cover portion in a cross section of the sample chip taken along the first and second directions at the center of the sample chip in the third direction at 50,000 magnification using an SEM manufactured by Carl Zeiss AG. Feret diameters of the pores and the dielectric grains on the scanned image were measured using Zootos as particle size measurement software and used were as the sizes of the pores and the dielectric grains.

Figure 8A:
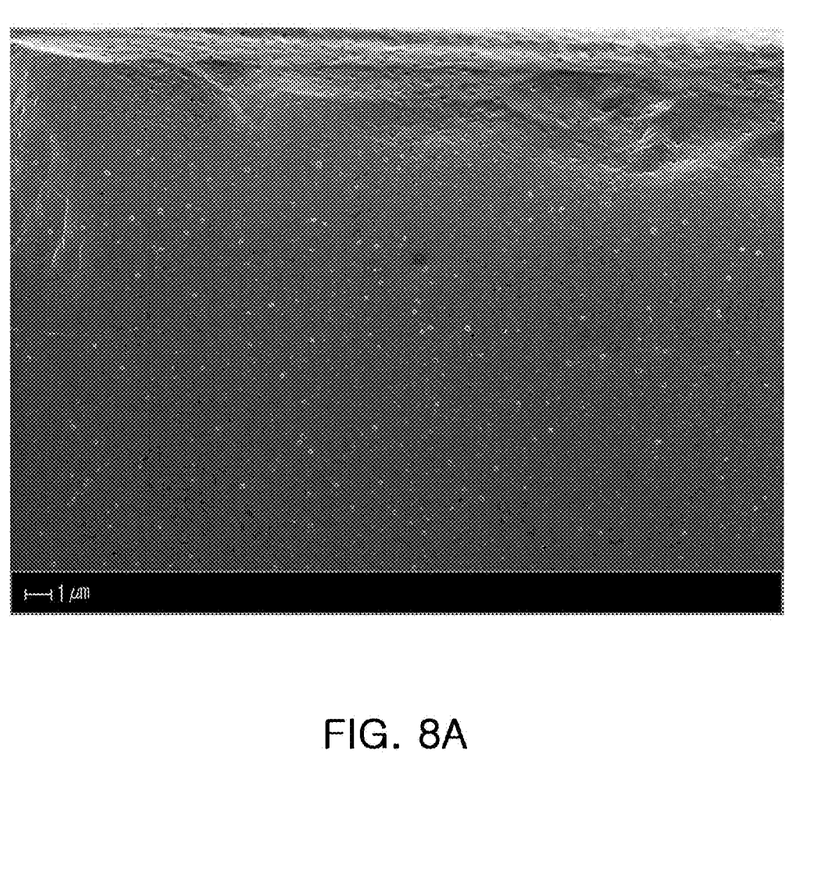
FIG. 8a is a photograph obtained by imaging a cross section of a cover portion of a comparative example with a scanning electron microscope (SEM)
Figure 8B:
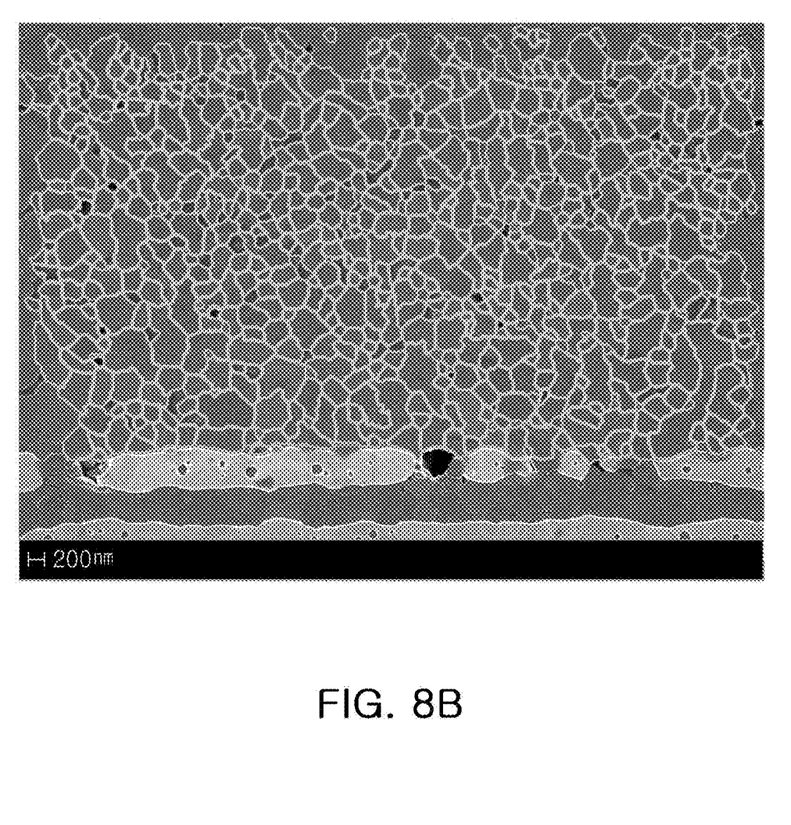
FIGS. 8b and 8c are views for describing a method of measuring dielectric grains and pores of the comparative example.
Figure 8C:
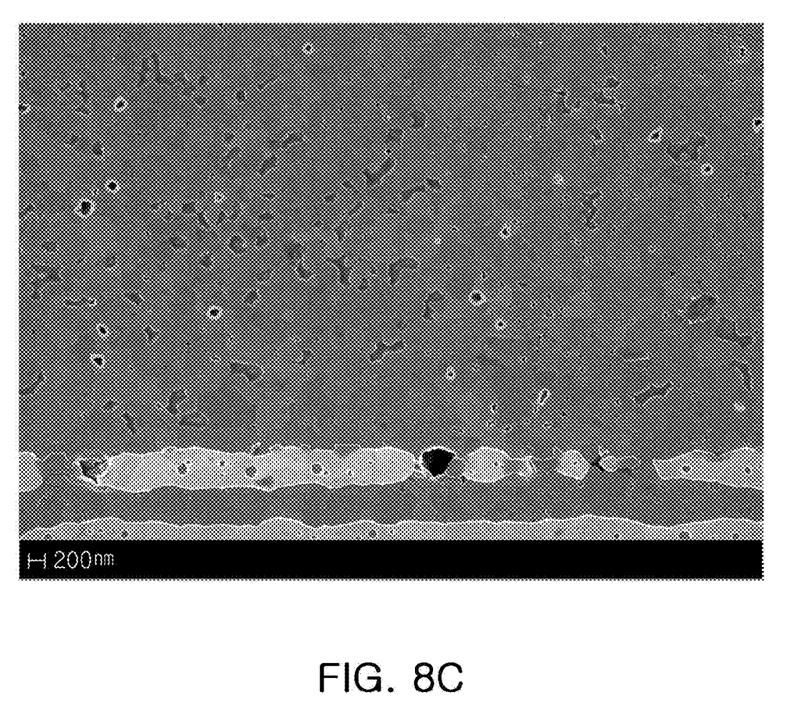
Figure 9A:
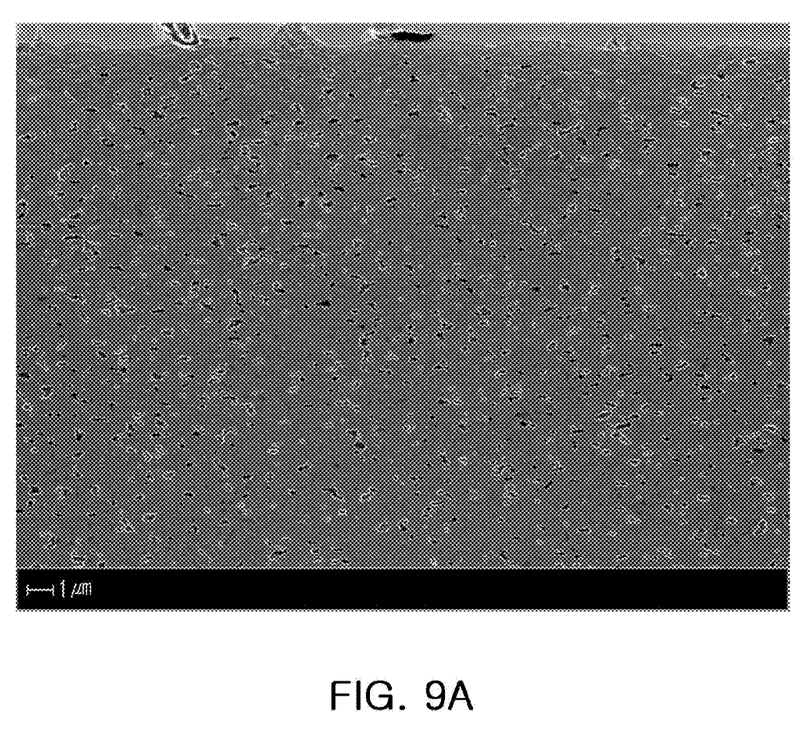
FIG. 9a is a photograph obtained by imaging a cross section of a cover portion of an inventive example with an SEM.
Figure 9B:
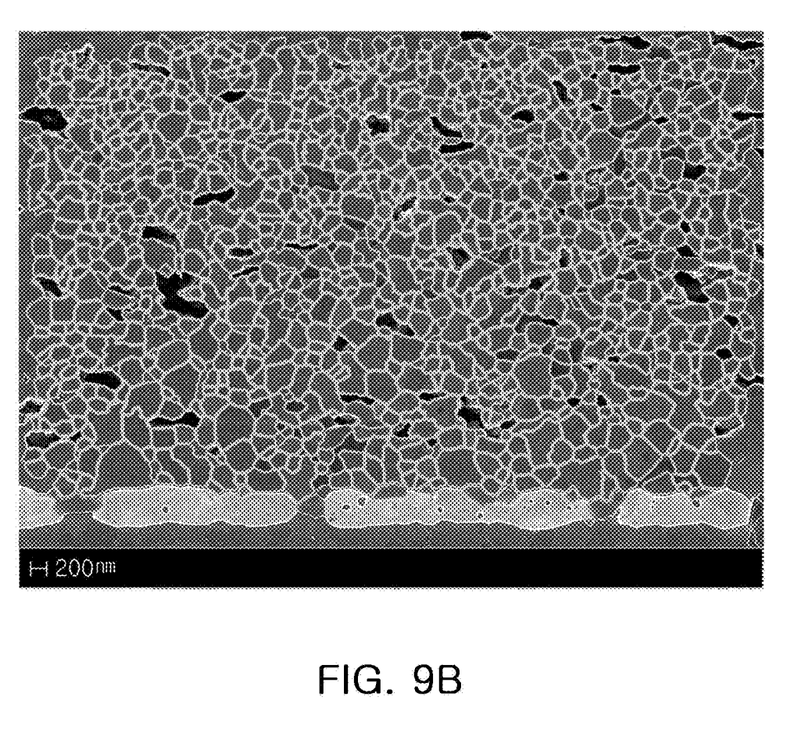
FIGS. 9b and 9c are views for describing a method of measuring dielectric grains and pores of the inventive example.
Figure 9C:
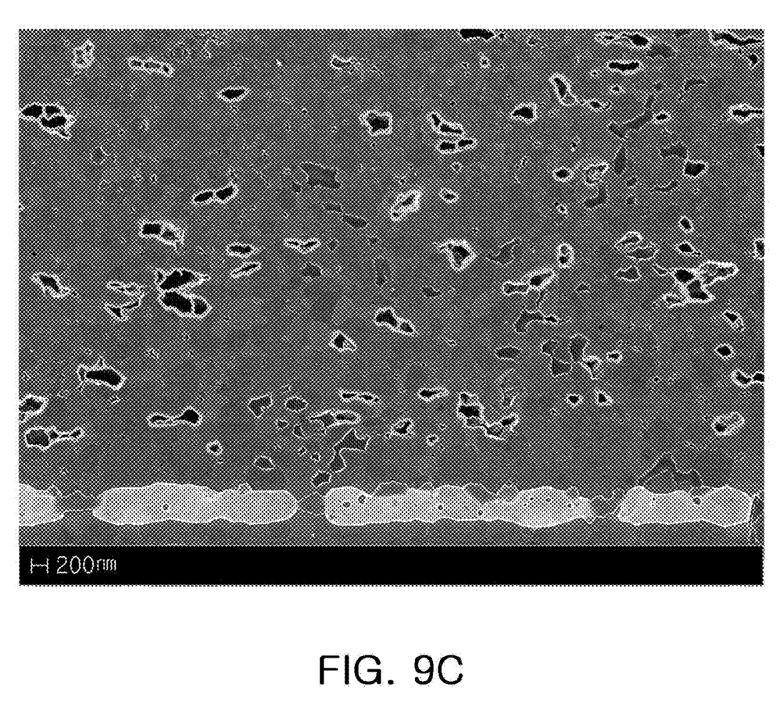

FIG. 8a is a photograph obtained by imaging the cross section of the cover portion of Test No. 3, and FIGS. 8b and 8c are photographs obtained by analyzing the dielectric grains and the pores using Zootos, respectively. FIG. 9a is a photograph obtained by imaging the cross section of the cover portion of Test No. 7, and FIGS. 9b and 9c are photographs obtained by analyzing the dielectric grains and the pores using Zootos, respectively.

TABLE 1

| Test No. | Gn/Pn | Crack | Ps/Gs | Waterproof reliability |
|---|---|---|---|---|
| 1* | 100 | NG | 0.06 | OK |
| 2* | 45 | NG | 0.3 | OK |
| 3* | 32 | NG | 0.9 | OK |
| 4* | 32 | NG | 1.5 | OK |
| 5 | 29 | OK | 2.1 | OK |
| 6 | 15 | OK | 2.5 | OK |
| 7 | 12 | OK | 2.9 | OK |
| 8* | 10 | OK | 3.1 | NG |

In Test Nos. 1 to 4, Gn/Pn was 32 or more, illustrating that the crack suppression effect was insufficient.

In Test Nos. 5 to 7, Gn/Pn was more than 10 and less than 30 as presented in the present disclosure, illustrating that the crack suppression effect was excellent and the waterproof reliability was excellent.

In Test No. 8, the crack suppression effect was excellent, but Gn/Pn was 10 or less, illustrating that the waterproof reliability was poor.

As set forth above, according to the exemplary embodiment in the present disclosure, the crack occurring in the multilayer electronic component may be suppressed by adjusting the ratio of the number of dielectric grains to the number of pores in the cover portion.

According to the exemplary embodiment in the present disclosure, the waterproof reliability may be improved.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
a body including a capacitance forming portion in which dielectric layers and internal electrodes are alternately disposed in a first direction, and cover portions disposed on an upper surface and a lower surface of the capacitance forming portion, respectively, in the first direction; and
external electrodes disposed on the body,
wherein the cover portion includes a plurality of dielectric grains and a plurality of pores, and
Gn/Pn is in a range from 12 to 29, in which Gn is number of dielectric grains included in the cover portion and Pn is number of pores included in the cover portion.

2. The multilayer electronic component of claim 1, wherein Ps/Gs is less than 3, in which Gs is an average size of the dielectric grains included in the cover portion and Ps is an average size of the pores included in the cover portion.

3. The multilayer electronic component of claim 2, wherein Ps/Gs is in a range from 2.1 to 2.9.

4. The multilayer electronic component of claim 1, wherein the body has first and second surfaces opposing each other in the first direction, third and fourth surfaces connected to the first and second surfaces and opposing each other in a second direction, and fifth and sixth surfaces connected to the first to fourth surfaces and opposing each other in a third direction,
side margin portions are disposed on the fifth and sixth surfaces of the body, respectively, and Gn1/Pn1 is more than 10 and less than 30, in which Gn1 is number of dielectric grains included in the side margin portions and Pn1 is number of pores included in the side margin portions.

5. The multilayer electronic component of claim 4, wherein Ps1/Gs1 is less than 3, in which Gs1 is an average size of the dielectric grains included in the side margin portions and Ps1 is an average size of the pores included in the side margin portions.

6. The multilayer electronic component of claim 5, wherein Gn1/Pn1 is in a range from 12 to 29, and each of Ps/Gs and Ps1/Gs1 is in a range from 2.1 to 2.9, in which Gs is an average size of the dielectric grains included in the cover portion and Ps is an average size of the pores included in the cover portion.

7. The multilayer electronic component of claim 4, wherein the external electrode includes a first external electrode disposed on the third surface and a second external electrode disposed on the fourth surface,
the internal electrode includes first internal electrodes in contact with the first external electrode and second internal electrodes in contact with the second external electrode, and opposite ends of the first and second internal electrodes in the third direction are in contact with the side margin portions.

8. The multilayer electronic component of claim 1, wherein the cover portion includes an upper cover portion disposed on an upper surface of the capacitance forming portion in the first direction, and a lower cover portion disposed on a lower surface of the capacitance forming portion in the first direction, and
a thickness of each of the upper and lower cover portions is in a range from 15 μm to 30 μm.

9. The multilayer electronic component of claim 2, wherein Gs is in a range from 150 nm to 390 nm.

10. The multilayer electronic component of claim 2, wherein Ps is in a range from 110 nm to 310 nm.

11. The multilayer electronic component of claim 1, wherein the cover portion is comprises a sintered a ceramic green sheet, wherein the ceramic green sheet comprises barium nitrate or a polymer blend.

12. The multilayer electronic component of claim 1, wherein a porosity of the dielectric layers included in the capacitance forming portion is 1% or less.

13. A multilayer electronic component comprising:
a body including a capacitance forming portion in which dielectric layers and internal electrodes are alternately disposed in a first direction, and cover portions disposed on an upper surface and a lower surface of the capacitance forming portion, respectively, in the first direction; and
external electrodes disposed on the body,
wherein the cover portion includes a plurality of dielectric grains and a plurality of pores, and
Ps/Gs is in a range from 2.1 to 2.9, in which Gs is an average size of the dielectric grains included in the cover portion and Ps is an average size of the pores included in the cover portion.

14. The multilayer electronic component of claim 13, and Gn/Pn is more than 10 and less than 30, in which Gn is number of dielectric grains included in the cover portion and Pn is number of pores included in the cover portion.

15. A multilayer electronic component, comprising:
a capacitance forming portion including internal electrodes and dielectric layers interposed therebetween;
upper and lower cover portions disposed respectively on upper and lower surfaces of the capacitance forming portion opposing in a thickness direction, the upper and lower cover portions comprising first dielectric grains and first pores; and
side margin portions disposed on opposing side surfaces of the capacitance forming portion in a width direction, the side margin portions comprising second dielectric grains and second pores,
wherein a ratio Gn1/Pn1 of number of second dielectric grains Gn1 to number of second pores Pn1 is in a range from 12 to 29.

16. The multilayer electronic component of claim 15, wherein a ratio Gn/Pn of number of first dielectric grains Gn to number of first pores Pn is in a range from 10 to 30.

17. The multilayer electronic component of claim 15, wherein a ratio Gs/Ps of an average size Gs of the first dielectric grains to an average size Ps of the first pores is less than 3.

18. The multilayer electronic component of claim 15, wherein a ratio Gs1/Ps1 of an average size Gs1 of the second dielectric grains to an average size Ps1 of the second pores is less than 3.

19. The multilayer electronic component of claim 15, wherein a material of the upper and lower cover portions is same as that of the side margin portions.

20. The multilayer electronic component of claim 15, wherein the dielectric layers of the capacitance forming portion comprise a material having a porosity of less than 1%.

21. The multilayer electronic component of claim 15, wherein the upper and lower cover portions comprise a sintered ceramic green sheet, the ceramic green sheet comprising a ceramic material and a pore forming material.

22. The multilayer electronic component of claim 21, wherein the pore forming material comprises barium nitrate or a polymer.

* * * * *